United States Patent
Tran et al.

(10) Patent No.: US 9,245,545 B1
(45) Date of Patent: Jan. 26, 2016

(54) SHORT YOKE LENGTH COILS FOR MAGNETIC HEADS IN DISK DRIVES

(71) Applicant: Western Digital (Fremont), LLC, Fremont, CA (US)

(72) Inventors: Ut Tran, San Jose, CA (US); Yunhe Huang, Pleasanton, CA (US); Keith Y. Sasaki, San Jose, CA (US); Curtis V. Macchioni, Livermore, CA (US); Zhigang Bai, Fremont, CA (US)

(73) Assignee: Wester Digital (Fremont), LLC, Fremont, CA (US)

( * ) Notice: Subject to any disclaimer, the term of this patent is extended or adjusted under 35 U.S.C. 154(b) by 146 days.

(21) Appl. No.: 13/899,260

(22) Filed: May 21, 2013

Related U.S. Application Data

(60) Provisional application No. 61/811,538, filed on Apr. 12, 2013.

(51) Int. Cl.
*H01B 13/00* (2006.01)
*G11B 5/33* (2006.01)

(52) U.S. Cl.
CPC ...................................... *G11B 5/332* (2013.01)

(58) Field of Classification Search
None
See application file for complete search history.

(56) References Cited

U.S. PATENT DOCUMENTS

| | | | |
|---|---|---|---|
| 4,539,616 A | 9/1985 | Yuito et al. | |
| 4,694,368 A | 9/1987 | Bischoff et al. | |
| 4,891,094 A | 1/1990 | Waldo, III | |
| 4,933,209 A | 6/1990 | Anthony et al. | |
| 5,173,826 A | 12/1992 | Bischoff | |
| 5,346,586 A | 9/1994 | Keller | |
| 5,472,736 A | 12/1995 | Barr et al. | |
| 5,707,777 A | 1/1998 | Aoai et al. | |
| 5,843,521 A * | 12/1998 | Ju et al. | 428/336 |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |

(Continued)

FOREIGN PATENT DOCUMENTS

JP 6-203332 7/1994

*Primary Examiner* — Binh X Tran
*Assistant Examiner* — David Cathey, Jr.

(57) ABSTRACT

A method of forming a single layer inductive coil structure includes forming a first conductive coil on a substrate, forming an insulating layer by atomic layer deposition (ALD) over the first coil and the substrate, and forming one or more additional conductive coils on each of adjacent sides of the first coil insulated from the first coil and the substrate by the insulating layer. A method of forming a stacked layer inductive coil includes forming a cavity in a substrate, forming a first coil in the cavity wherein the cavity has an atomic layer deposition (ALD) layer, forming a second coil in the cavity adjacent to the first coil and separated by the ALD layer from the first coil, forming an insulating layer over the first and second coil, and forming a third coil on the insulating layer.

11 Claims, 15 Drawing Sheets

(56) References Cited

U.S. PATENT DOCUMENTS

| | | | |
|---|---|---|---|
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,151,194 A | 11/2000 | Steinbrecher |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,246,541 B1 | 6/2001 | Furuichi et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,525,901 B1 | 2/2003 | Kamijima et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,654,202 B2 | 11/2003 | Rea et al. |

(56) References Cited

U.S. PATENT DOCUMENTS

| | | |
|---|---|---|
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,804,879 B2 | 10/2004 | Hsiao et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,901,653 B2 | 6/2005 | Hsiao et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,075,750 B2 | 7/2006 | Bedell et al. |
| 7,079,355 B2 | 7/2006 | Hsiao et al. |
| 7,089,651 B2 | 8/2006 | Zheng et al. |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,116,518 B2 | 10/2006 | Han et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,268,975 B2 | 9/2007 | Han et al. |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |

(56) References Cited

U.S. PATENT DOCUMENTS

| | | |
|---|---|---|
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |

(56) References Cited

U.S. PATENT DOCUMENTS

| | | | |
|---|---|---|---|
| 8,404,129 B1 | 3/2013 | Luo et al. | |
| 8,405,930 B1 | 3/2013 | Li et al. | |
| 8,409,453 B1 | 4/2013 | Jiang et al. | |
| 8,413,317 B1 | 4/2013 | Wan et al. | |
| 8,416,540 B1 | 4/2013 | Li et al. | |
| 8,419,953 B1 | 4/2013 | Su et al. | |
| 8,419,954 B1 | 4/2013 | Chen et al. | |
| 8,422,176 B1 | 4/2013 | Leng et al. | |
| 8,422,342 B1 | 4/2013 | Lee | |
| 8,422,841 B1 | 4/2013 | Shi et al. | |
| 8,424,192 B1 | 4/2013 | Yang et al. | |
| 8,441,756 B1 | 5/2013 | Sun et al. | |
| 8,443,510 B1 | 5/2013 | Shi et al. | |
| 8,444,866 B1 | 5/2013 | Guan et al. | |
| 8,449,948 B2 | 5/2013 | Medina et al. | |
| 8,451,556 B1 | 5/2013 | Wang et al. | |
| 8,451,563 B1 | 5/2013 | Zhang et al. | |
| 8,454,846 B1 | 6/2013 | Zhou et al. | |
| 8,455,119 B1 | 6/2013 | Jiang et al. | |
| 8,456,961 B1 | 6/2013 | Wang et al. | |
| 8,456,963 B1 | 6/2013 | Hu et al. | |
| 8,456,964 B1 | 6/2013 | Yuan et al. | |
| 8,456,966 B1 | 6/2013 | Shi et al. | |
| 8,456,967 B1 | 6/2013 | Mallary | |
| 8,458,892 B2 | 6/2013 | Si et al. | |
| 8,462,592 B1 | 6/2013 | Wolf et al. | |
| 8,468,682 B1 | 6/2013 | Zhang | |
| 8,472,288 B1 | 6/2013 | Wolf et al. | |
| 8,480,911 B1 | 7/2013 | Osugi et al. | |
| 8,486,285 B2 | 7/2013 | Zhou et al. | |
| 8,486,286 B1 | 7/2013 | Gao et al. | |
| 8,488,272 B1 | 7/2013 | Tran et al. | |
| 8,491,801 B1 | 7/2013 | Tanner et al. | |
| 8,491,802 B1 | 7/2013 | Gao et al. | |
| 8,493,693 B1 | 7/2013 | Zheng et al. | |
| 8,493,695 B1 | 7/2013 | Kaiser et al. | |
| 8,495,813 B1 | 7/2013 | Hu et al. | |
| 8,498,084 B1 | 7/2013 | Leng et al. | |
| 8,506,828 B1 | 8/2013 | Osugi et al. | |
| 8,514,517 B1 | 8/2013 | Batra et al. | |
| 8,518,279 B1 | 8/2013 | Wang et al. | |
| 8,518,832 B1 | 8/2013 | Yang et al. | |
| 8,520,336 B1 | 8/2013 | Liu et al. | |
| 8,520,337 B1 | 8/2013 | Liu et al. | |
| 8,524,068 B2 | 9/2013 | Medina et al. | |
| 8,526,275 B1 | 9/2013 | Yuan et al. | |
| 8,531,801 B1 | 9/2013 | Xiao et al. | |
| 8,532,450 B1 | 9/2013 | Wang et al. | |
| 8,533,937 B1 | 9/2013 | Wang et al. | |
| 8,537,494 B1 | 9/2013 | Pan et al. | |
| 8,537,495 B1 | 9/2013 | Luo et al. | |
| 8,537,502 B1 | 9/2013 | Park et al. | |
| 8,545,999 B1 | 10/2013 | Leng et al. | |
| 8,547,659 B1 | 10/2013 | Bai et al. | |
| 8,547,667 B1 | 10/2013 | Roy et al. | |
| 8,547,730 B1 | 10/2013 | Shen et al. | |
| 8,555,486 B1 | 10/2013 | Medina et al. | |
| 8,559,141 B1 | 10/2013 | Pakala et al. | |
| 8,563,146 B1 | 10/2013 | Zhang et al. | |
| 8,565,049 B1 | 10/2013 | Tanner et al. | |
| 8,576,517 B1 | 11/2013 | Tran et al. | |
| 8,578,594 B2 | 11/2013 | Jiang et al. | |
| 8,582,238 B1 | 11/2013 | Liu et al. | |
| 8,582,241 B1 | 11/2013 | Yu et al. | |
| 8,582,253 B1 | 11/2013 | Zheng et al. | |
| 8,588,039 B1 | 11/2013 | Shi et al. | |
| 8,593,914 B2 | 11/2013 | Wang et al. | |
| 8,597,528 B1 | 12/2013 | Roy et al. | |
| 8,599,520 B1 | 12/2013 | Liu et al. | |
| 8,599,657 B1 | 12/2013 | Lee | |
| 8,603,593 B1 | 12/2013 | Roy et al. | |
| 8,607,438 B1 | 12/2013 | Gao et al. | |
| 8,607,439 B1 | 12/2013 | Wang et al. | |
| 8,611,035 B1 | 12/2013 | Bajikar et al. | |
| 8,611,054 B1 | 12/2013 | Shang et al. | |
| 8,611,055 B1 | 12/2013 | Pakala et al. | |
| 8,614,864 B1 | 12/2013 | Hong et al. | |
| 8,619,512 B1 | 12/2013 | Yuan et al. | |
| 8,625,233 B1 | 1/2014 | Ji et al. | |
| 8,625,941 B1 | 1/2014 | Shi et al. | |
| 8,628,672 B1 | 1/2014 | Si et al. | |
| 8,630,068 B1 | 1/2014 | Mauri et al. | |
| 8,634,280 B1 | 1/2014 | Wang et al. | |
| 8,638,529 B1 | 1/2014 | Leng et al. | |
| 8,643,980 B1 | 2/2014 | Fowler et al. | |
| 8,649,123 B1 | 2/2014 | Zhang et al. | |
| 8,665,561 B1 | 3/2014 | Knutson et al. | |
| 8,670,211 B1 | 3/2014 | Sun et al. | |
| 8,670,213 B1 | 3/2014 | Zeng et al. | |
| 8,670,214 B1 | 3/2014 | Knutson et al. | |
| 8,670,294 B1 | 3/2014 | Shi et al. | |
| 8,670,295 B1 | 3/2014 | Hu et al. | |
| 8,675,318 B1 | 3/2014 | Ho et al. | |
| 8,675,455 B1 | 3/2014 | Krichevsky et al. | |
| 8,681,594 B1 | 3/2014 | Shi et al. | |
| 8,689,430 B1 | 4/2014 | Chen et al. | |
| 8,693,141 B1 | 4/2014 | Elliott et al. | |
| 8,703,397 B1 | 4/2014 | Zeng et al. | |
| 8,705,205 B1 | 4/2014 | Li et al. | |
| 8,711,518 B1 | 4/2014 | Zeng et al. | |
| 8,711,528 B1 | 4/2014 | Xiao et al. | |
| 8,717,709 B1 | 5/2014 | Shi et al. | |
| 8,720,044 B1 | 5/2014 | Tran et al. | |
| 8,721,902 B1 | 5/2014 | Wang et al. | |
| 8,724,259 B1 | 5/2014 | Liu et al. | |
| 8,749,790 B1 | 6/2014 | Tanner et al. | |
| 8,749,920 B1 | 6/2014 | Knutson et al. | |
| 8,753,903 B1 | 6/2014 | Tanner et al. | |
| 8,760,807 B1 | 6/2014 | Zhang et al. | |
| 8,760,818 B1 | 6/2014 | Diao et al. | |
| 8,760,819 B1 | 6/2014 | Liu et al. | |
| 8,760,822 B1 | 6/2014 | Li et al. | |
| 8,760,823 B1 | 6/2014 | Chen et al. | |
| 8,763,235 B1 | 7/2014 | Wang et al. | |
| 8,780,498 B1 | 7/2014 | Jiang et al. | |
| 8,780,505 B1 | 7/2014 | Xiao | |
| 8,786,983 B1 | 7/2014 | Liu et al. | |
| 8,790,524 B1 | 7/2014 | Luo et al. | |
| 8,790,527 B1 | 7/2014 | Luo et al. | |
| 8,792,208 B1 | 7/2014 | Liu et al. | |
| 8,792,312 B1 | 7/2014 | Wang et al. | |
| 8,793,866 B1 | 8/2014 | Zhang et al. | |
| 8,797,680 B1 | 8/2014 | Luo et al. | |
| 8,797,684 B1 | 8/2014 | Tran et al. | |
| 8,797,686 B1 | 8/2014 | Bai et al. | |
| 8,797,692 B1 | 8/2014 | Guo et al. | |
| 8,813,324 B2 | 8/2014 | Emley et al. | |
| 2002/0181162 A1 | 12/2002 | Chen et al. | |
| 2002/0196591 A1* | 12/2002 | Hujanen et al. | 360/326 |
| 2003/0076626 A1 | 4/2003 | Hsiao et al. | |
| 2003/0090834 A1 | 5/2003 | Kamarajugadda et al. | |
| 2003/0184912 A1 | 10/2003 | Hsiao et al. | |
| 2004/0080866 A1 | 4/2004 | Hsiao et al. | |
| 2005/0007697 A1 | 1/2005 | Hsu et al. | |
| 2005/0024765 A1 | 2/2005 | Han et al. | |
| 2005/0045848 A1 | 3/2005 | Bedell et al. | |
| 2005/0047011 A1 | 3/2005 | Han et al. | |
| 2005/0047013 A1 | 3/2005 | Le et al. | |
| 2005/0125990 A1 | 6/2005 | Allen et al. | |
| 2005/0189319 A1 | 9/2005 | Guthrie et al. | |
| 2006/0174474 A1 | 8/2006 | Le | |
| 2007/0064344 A1 | 3/2007 | Etoh et al. | |
| 2007/0202686 A1 | 8/2007 | Dixit et al. | |
| 2008/0002290 A1 | 1/2008 | Allen et al. | |
| 2008/0096389 A1 | 4/2008 | Feng et al. | |
| 2010/0077600 A1* | 4/2010 | Seki et al. | 29/603.09 |
| 2010/0290157 A1 | 11/2010 | Zhang et al. | |
| 2011/0086240 A1 | 4/2011 | Xiang et al. | |
| 2011/0188354 A1* | 8/2011 | Sasaki et al. | 369/13.32 |
| 2012/0111826 A1 | 5/2012 | Chen et al. | |
| 2012/0216378 A1 | 8/2012 | Emley et al. | |
| 2012/0237878 A1 | 9/2012 | Zeng et al. | |
| 2012/0298621 A1 | 11/2012 | Gao | |
| 2013/0216702 A1 | 8/2013 | Kaiser et al. | |

(56) References Cited

U.S. PATENT DOCUMENTS

| | | |
|---|---|---|
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

* cited by examiner

SHORT YOKE LENGTH COILS FOR MAGNETIC HEADS IN DISK DRIVES

CROSS REFERENCE TO RELATED APPLICATIONS

The present application claims priority of Provisional Patent Application No. 61/811,538, titled "SHORT YOKE LENGTH COIL USING ATOMIC LAYER DEPOSITION ALUMINA FOR COIL SEPARATION," filed Apr. 12, 2013, and is incorporated herein in its entirety.

BACKGROUND

The present disclosure relates generally to hard drive disks, and more particularly, to short yoke length coils for magnetic heads in disk drives.

Data is stored on magnetic media using a write head. Writing involves storing a data bit by utilizing magnetic flux from a write head to set the magnetic moment of a particular area on the magnetic media, typically a magnetic disk. An actuator arm moves the magnetic head on an arc across the rotating disk, thereby allowing the magnetic head to access the entire disk. The state of the magnetic moment is later read, using a read head, to retrieve the stored information. Data density is determined by the amount of data stored on an area of magnetic media and depends on how much area must be allocated to each bit. Data on a magnetic disk is stored in multiple concentric tracks, where increasing the number of bits per track and tracks per disk increases data density. Typically, the bits are orientated perpendicular to the disk. These systems, known as PMR systems, reduce the size of the segment required to represent one bit of information through the perpendicular orientation of the magnetization, thereby increasing the areal density.

Data density, or areal density, is determined by both the bit length and by the width of the bit. Areal density is equal to the bits-per-inch along the track times the tracks-per-inch radially on the disk. To decrease bit size, head size is decreased by fabricating thin film read and write heads.

A thin film write head consists of three principal functional parts, a yoke (having two poles), a pancake shaped copper coil wound around the yoke, and a front gap between the poles, all made from thin films. The coil, which is sandwiched by the two poles (a write pole and a return pole), converts electrical signals (a write current) into magnetic fields. The yoke poles, which are conventionally separated by a gap layer, coil, and insulation layers, is used to form a low-reluctance (high permanence) magnetic circuit and to deliver the magnetic flux generated by the coil to the front gap. Insulation layers between the coil and the poles are typically made of hard-cured photoresist. The stray field from an air bearing surface (ABS) in close proximity to the magnetic disk is used for writing.

The write current applied to the coil is in general rectangular wave shape pulses. When rectangular wave shape pulses are applied, the coil inductance affects the temporal current induced magnetic field response, which depends upon the structure of the thin-film magnetic head, upon an output impedance of a current source connected with the coil, and upon a frequency and a voltage of the applied rectangular wave pulses. These are affected also by a characteristic impedance of trace conductors and connection lines between the current source and the magnetic head. Particularly, when the influence of the trace conductor is eliminated by fixing the frequency and the current of the applied pulses, this variation in the wave shape of the current is caused by non-linearity of the input impedance of the coil.

If the wave shape of the current flowing through the inductive write head element of the thin-film magnetic head is deformed, magnetic patterns written in a magnetic medium will become distorted and thus write and read operations of data will become difficult. Also, in order to improve the non-linear transition shift (NLTS) in dynamic characteristics, it is necessary to shorten a rising time of the wave shape of the current flowing through the coil.

Therefore, the requirements for the wave shape of the current flowing through the coil are to maintain a profile of the rectangular wave shape pulses provided from the current source as much as possible, to have a short rising time, and to have a high current value while holding the rectangular wave shape in order to obtain a strong write magnetic field.

These requirements may be satisfied by decreasing the coil inductance at the frequency of the write current. However, if the number of turns of the coil is reduced to decrease the inductance, magnetic force generated from the coil will decrease causing no improvement of the characteristics. Also, if the size of the coil is reduced by narrowing a coil pitch, difficulty in fabrication of the coil may occur with conventional fabrication procedures.

For high data rate writer application, one of the requirements is to have fast saturation and low inductance to induce short rise time. Using photoresist for insulation may result in limiting minimum dimensions in reducing the yoke length and coil. A shorter coil yoke length may provide an advantage with respect to data rate characteristics of the write head.

SUMMARY

One aspect of a method of forming a single layer coil in a magnetic transducer includes forming a first coil on a substrate, forming an insulating layer over the first coil and the substrate, forming a second pair of coils on opposite adjacent sides of the first coil and insulated from the first coil by the insulating layer, and forming a single encapsulation of magnetic material over the first coil and second pair of coils.

Another aspect of a method of forming a stacked layer coil includes forming a cavity in a substrate, forming a first coil in the cavity, forming a second coil in the cavity adjacent to the first coil and separated by an atomic layer deposition (ALD) layer from the first coil, forming an insulating layer over the first and second coil, and forming a third coil on the insulating layer above the first and second coil.

A further aspect of a method of forming a multi-turn inductive coil includes forming a plurality of conductive coils on a substrate arranged with the electrical interconnect pattern, forming an insulating atomic layer deposition (ALD) layer on the coils, planarizing the ALD to expose the conductive coils, forming an insulating cap on the exposed conductive coils, and forming a layer of magnetic material over the ALD coated and capped conductive coils.

Another aspect of a method of forming a plurality of conductive coils on a substrate arranged with the electrical interconnect pattern includes forming an insulating atomic layer deposition (ALD) layer on the coils, planarizing the ALD to expose the conductive coils, forming an insulating cap on the exposed conductive coils, and forming a layer of magnetic material over the ALD coated and capped conductive coils.

It will be understood that other aspects of the present invention will become readily apparent to those skilled in the art from the following detailed description, wherein it is shown and described only several embodiments of the invention by way of illustration. As will be realized by those skilled in the art, the present invention is capable of other and different embodiments and its several details are capable of modification in various other respects, all without departing from the spirit and scope of the invention. Accordingly, the drawings and detailed description are to be regarded as illustrative in nature and not as restrictive

BRIEF DESCRIPTION OF THE DRAWINGS

Various aspects of the present disclosure will now be presented in the detailed description by way of example, and not by way of limitation, with reference to the accompanying drawings, wherein.

DETAILED DESCRIPTION

The detailed description is intended to provide a description of various exemplary embodiments of the present invention and is not intended to represent the only embodiments in which the invention may be practiced. The term "exemplary" used throughout this disclosure means "serving as an example, instance, or illustration," and should not necessarily be construed as preferred or advantageous over other embodiments. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

In the following detailed description, various aspects of the present invention will be presented in the context of forming SYL (short yoke length) coil structures for a write pole in a magnetic hard disk drive. While these inventive aspects may be well suited for this application, those skilled in the art will realize that such aspects may be applied elsewhere in a magnetic hard drive disk and extended to other magnetic devices. Accordingly, any reference to a fabrication method of an SYL coil structure for a magnetic hard disk drive is intended only to illustrate the various aspects of the present invention, with the understanding that such aspects may have a wide range of applications.

Figure 1:
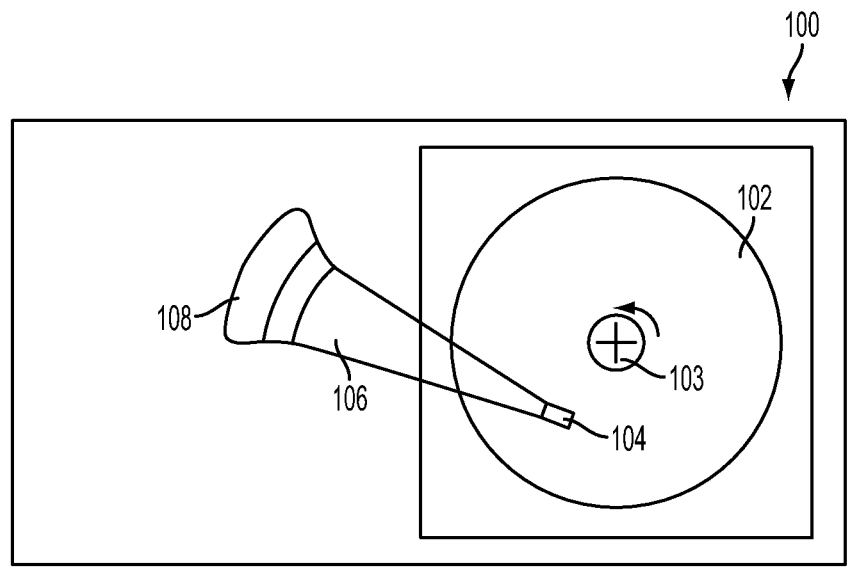
FIG. 1 is a conceptual view illustrating various aspects of an exemplary magnetic disk drive.

FIG. 1 is a conceptual view illustrating various aspects of an exemplary hard magnetic disk drive. The magnetic disk drive 100 is shown with a rotatable magnetic disk 102. The magnetic disk 102 may be rotated on a spindle 103 by a disk drive motor (not shown) located under the magnetic disk 102. A head 104, which can be a perpendicular magnetic recording (PMR) head or lateral magnetic recording (LMR) head, may be used to read and write information by detecting and modifying the magnetic polarization of the recording layer on the disk's surface. The head 104 is generally integrally formed with a carrier or slider (not shown). The function of the slider is to support the head 104 and any electrical connections between the head 104 and the rest of the magnetic disk drive 100. The slider is mounted to an actuator arm 106 which may be used to move the head 104 on an arc across the rotating magnetic disk 102, thereby allowing the head 104 to access the entire surface of the magnetic disk 102. The actuator arm 106 may be moved using an actuator 108.

Figure 2:
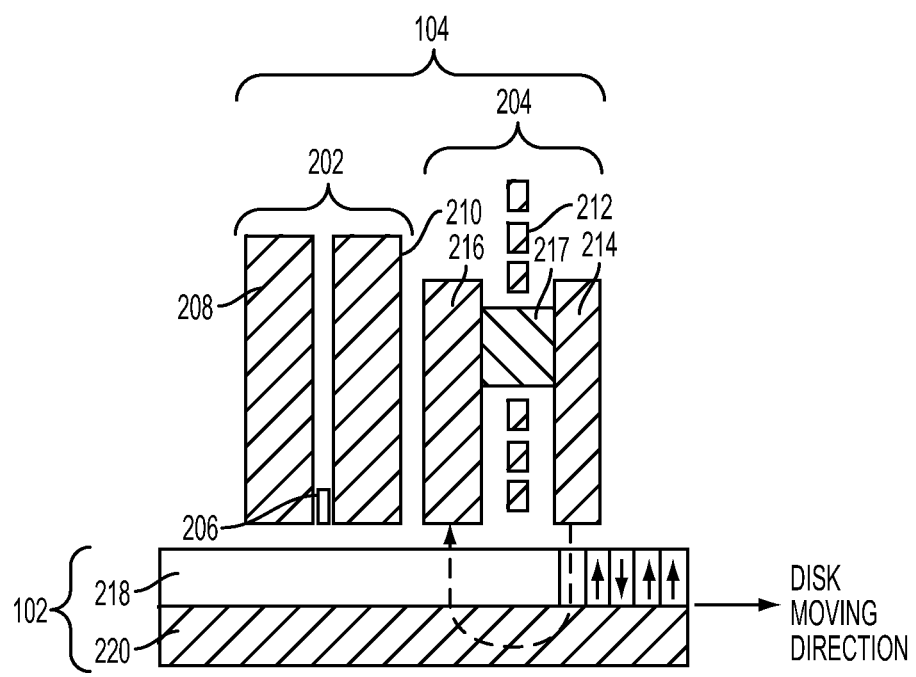
FIG. 2 is a cross-section view illustrating various aspects of an exemplary head and magnetic disk.

FIG. 2 is a cross-section view of an exemplary PMR head and magnetic disk. The PMR head 104 is shown with a PMR read head 202 and a PRM write head 204. The PMR read head 202 includes a read element 206 positioned between two shields 208 and 210. The PMR write head 204 includes a write pole 214 coupled to an auxiliary pole 216 by a yoke 217. A thin film SYL coil 212 is positioned between the main and auxiliary poles.

The magnetic disk 102 is shown with a hard magnetic recording layer 218 and a soft magnetic under-layer 220, which together provide a flux path between the write and auxiliary poles. The magnetic disk 102 may have other layers that have been omitted from this description for the purpose of clarity.

In this example, the magnetic disk 102 is moved past the PMR head 104 along a circular track of the magnetic disk 102. When current is applied to the thin film coil 212, a perpendicular magnetic field is created between the tip of the write pole 214 and the soft magnetic under-layer 220. The magnetic flux is collected by the soft magnetic under-layer 220 and returned to the auxiliary pole 216 to complete the magnetic circuit. The result is a magnetic polarization with a perpendicular orientation on the segment of the magnetic recording layer 218 of the disk 102 immediately below the write pole 214 of the write head 204. The recording magnetic field distribution depends on the shape of the write pole 214.

Returning to FIG. 1, the slider is sliced from a wafer containing the head 104 which is created through a semiconductor-like process. Various aspects of forming a thin SYL coil in the wafer as part of the process of fabricating the slider will now be presented.

In a first embodiment, a single layer coil is used. In this embodiment, a single layer coil is provided, with the middle coil plated first. ALD defines the coil separation, and then the outer coils are plated. The formation of magnetic portions of the yoke may be performed in a single deposition operation, after coil formation.

Figure 3:
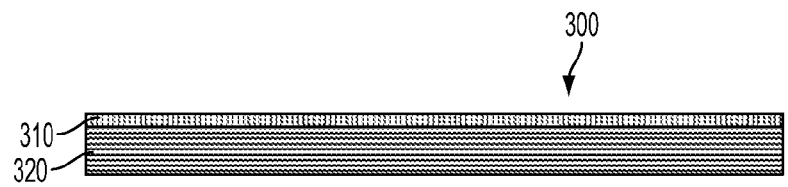
FIG. 3 is a cross-section view illustrating various aspects of a first step in an exemplary process for forming a short yoke length coil in accordance with a first embodiment of the disclosure.

The process is illustrated by reference to FIGS. 3-12. In FIG. 3 a seed layer of conductive material 310 (e.g., including a metal, such as Cu, but not so limited) is deposited on a substrate 320, which may be an insulating material, to form structure 300. The seed layer may be a metal, such as Cu, Ag, Au, but is not so limited, although Cu is conventionally chosen. Additionally, other conductive materials, not yet discovered or developed, may also be used. For example, a high temperature superconductor may be used, if found satisfactory.

Figure 4:
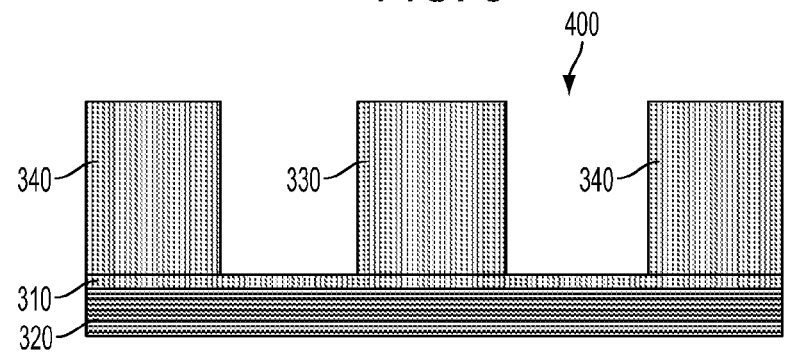
FIG. 4 is a cross-section view illustrating various aspects of a second step in an exemplary process for forming a short yoke length coil in accordance with a first embodiment of the disclosure.

In FIG. 4, after photolithographic patterning, a middle coil loop 330 is plated up with conductive material (again, e.g., Cu or other suitable material). Additional conductive material 340 may be deposited, such as by plating at the same time as the middle coil loop 330, but spaced apart from the middle coil loop 330, to complete a structure 400 for further processing, but which will later be sacrificially removed.

Figure 5:
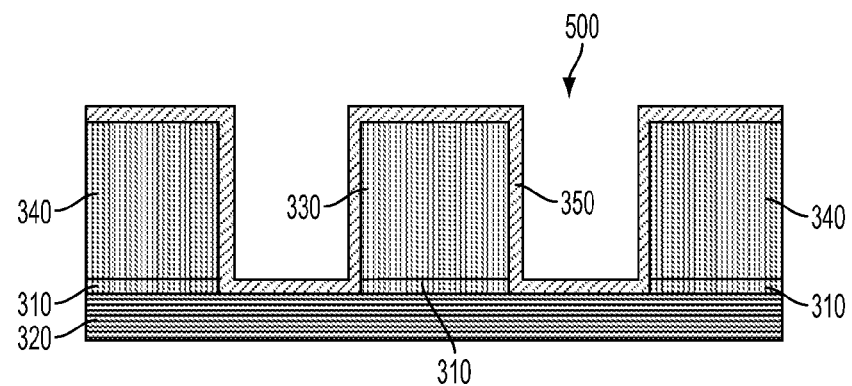
FIG. 5 is a cross-section view illustrating various aspects of a third step in an exemplary process for forming a short yoke length coil in accordance with a first embodiment of the disclosure.

In FIG. 5, the seed layer 310 between the middle coil loop 330 and the additional conductive material 340 is milled from the substrate 320, and the remaining plated conductive material 330, 340, and substrate 320 are overcoated with an ALD layer 350 for electrical insulation to form a structure 500. The ALD layer 350 may be alumina, but other insulating material may be used. It may be appreciated that the ALD layer may be thinner than conventional insulating layers, such as hard baked photoresist. This facilitates the shortening of the yolk in a stacked coil configuration.

Figure 6:
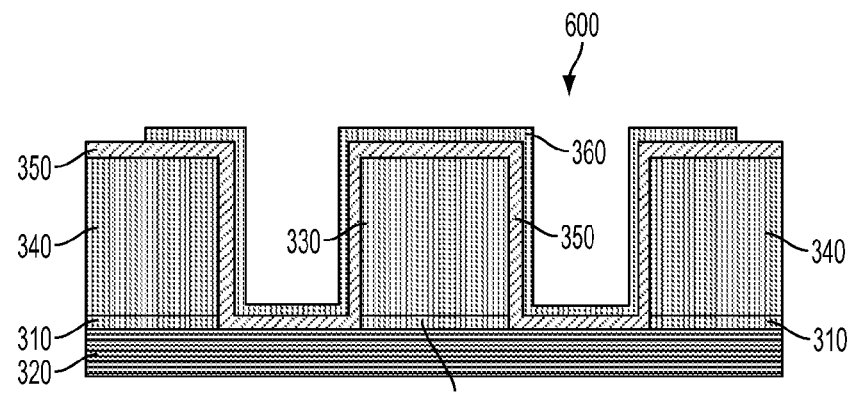
FIG. 6 is a cross-section view illustrating various aspects of a fourth step in an exemplary process for forming a short yoke length coil in accordance with a first embodiment the disclosure.
Figure 7:
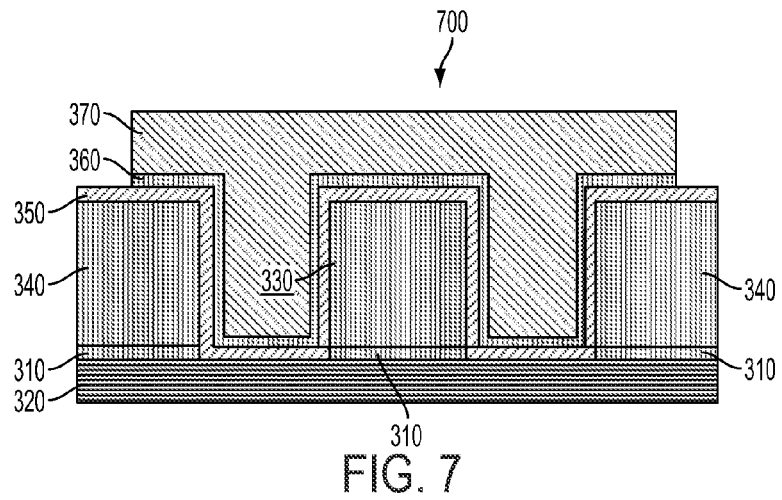
FIG. 7 is a cross-section view illustrating various aspects of a fifth step in an exemplary process for forming a short yoke length coil in accordance with a first embodiment the disclosure.

In FIG. 6, another conductive material seed layer (e.g., Cu) 360 is then deposited over the entire structure. A photolithographic pattern for purposes of defining an outer coil may be disposed over the existing structure, and excess seed layer material is removed, for example, by wet etching, reactive ion etching, resist lifting or the like, to provide a structure 600. In FIG. 7 conductive material 370 (e.g., Cu) is then plated up from the remaining seed layer, forming a structure 700.

Figure 8:
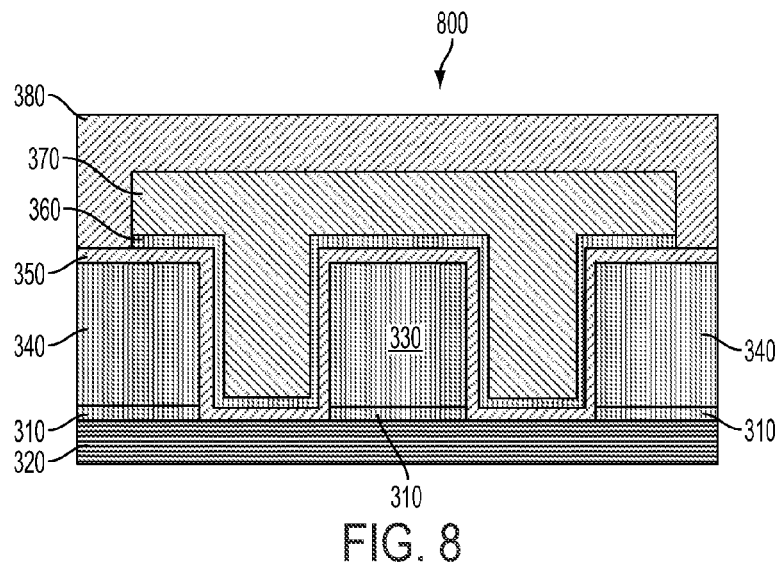
FIG. 8 is a cross-section view illustrating various aspects of a sixth step in an exemplary process for forming a short yoke length coil in accordance with a first embodiment of the disclosure.

In FIG. 8 the method continues with deposition of an insulating overcoat 380 (e.g., alumina) of sufficient thickness and mechanical rigidity to cap the entire structure 800, as shown. This deposition may provide mechanical rigidity over the surface area of the substrate during subsequent removal of the plated conductive material, described below, where the plated conductive material may only be deposited on to a small portion of the substrate 320.

Figure 9:
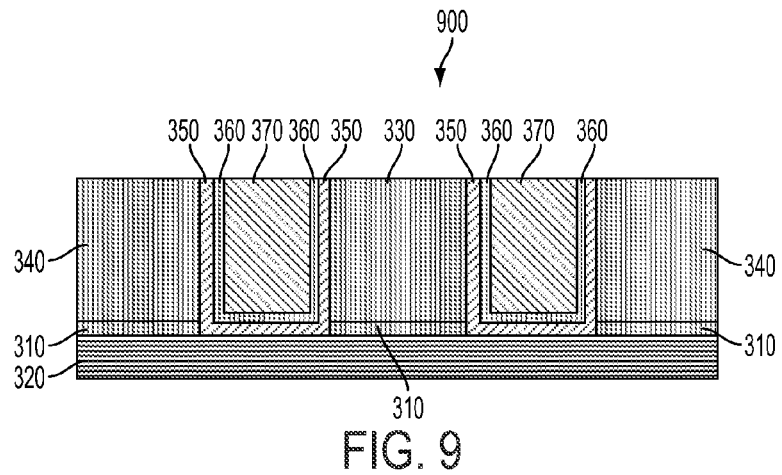
FIG. 9 is a cross-section view illustrating various aspects of a seventh step in an exemplary process for forming a short yoke length coil in accordance with a first embodiment of the disclosure.

In FIG. 9 a chemical mechanical polish (CMP) removes the cap layer 380, excess conductive material 370 (including portions of the seed layer 360), and top surface portions of the ALD layer 350 (that was deposited as shown in FIG. 5), and planarizes the structure to the height of the middle coil loop 330, forming structure 900.

Figure 10:
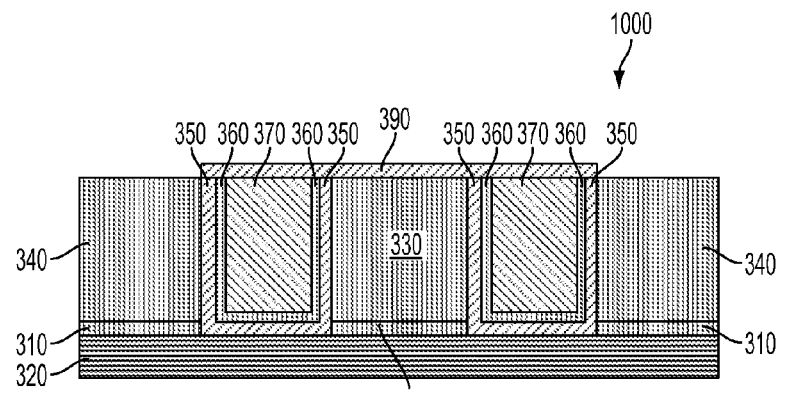
FIG. 10 is a cross-section view illustrating various aspects of an eighth step in an exemplary process for forming a short yoke length coil in accordance with a first embodiment of the disclosure.
Figure 11:
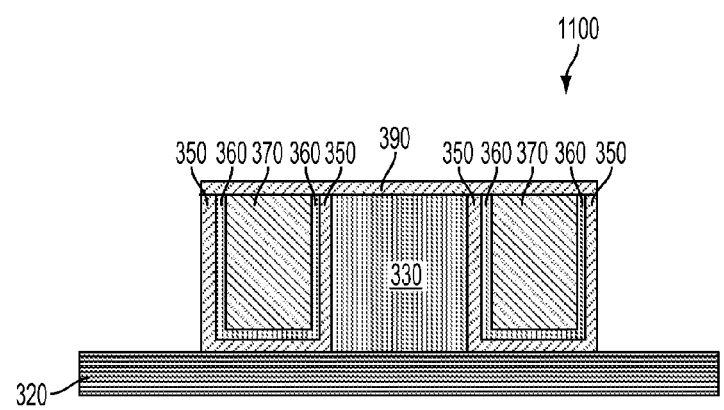
FIG. 11 is a cross-section view illustrating various aspects of a ninth step in an exemplary process for forming a short yoke length coil in accordance with a first embodiment of the disclosure.
Figure 12:
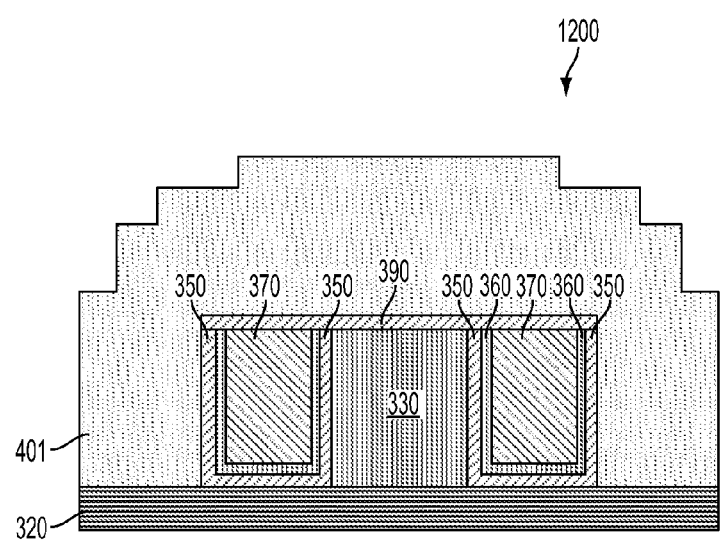
FIG. 12 is a cross-section view illustrating a tenth step in an exemplary process for forming a short yoke length coil in accordance with a first embodiment of the disclosure.

In FIG. 10 an insulating cap layer 390 is deposited over the middle and outer coil loops, both for electrical isolation and to mask the coils for the next step, forming structure 1000. In FIG. 11 the sacrificial conductive material 340 is removed, for example, by etching, forming structure 1100. In FIG. 12, a magnetic alloy 401 is deposited over the middle and outer coil loops 330, 370, forming at least a part of a shield structure as structure 1200. The magnetic alloy 401 may be a Ni—Fe, C—FE, or Co—Ni—Fe alloy, but any equivalent materials having a magnetic permeability in a desired range may be used.

In another embodiment, a method for providing a magnetic writer with a three turn stack coil, wherein each turn is formed separately; a first bottom turn is patterned and plated above a yoke, a dielectric layer is provided over the plating; a second bottom turn is plated over the yoke adjacent to the first turn; planarization then follows; a dielectric layer is provided over the first and second bottom turns; and a top turn plated above the dielectric layer.

Figure 13:
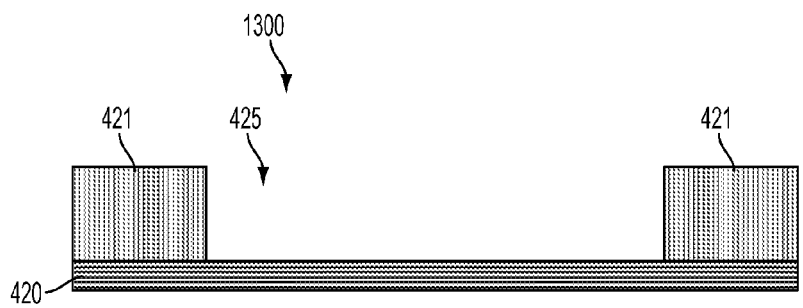
FIG. 13 is a cross-section view illustrating various aspects of a first step in an exemplary process to form a short yoke length coil in accordance with a second embodiment of the disclosure.
Figure 14:
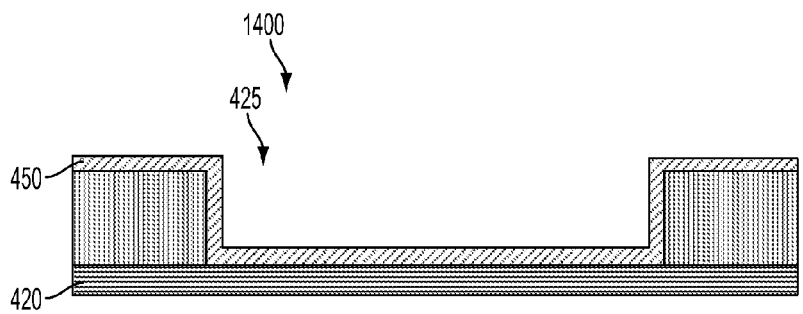
FIG. 14 is a cross-section view illustrating various aspects of a second step in an exemplary process to form a short yoke length coil in accordance with a second embodiment of the disclosure.

The process is illustrated by reference to FIGS. 13-24. In FIG. 13 a schematic of the apex of the yoke region is shown, defining a cavity 425 in a magnetic alloy material 421 on a substrate 420, forming structure 1300. In FIG. 14, an insulating ALD layer 450 of, for example, alumina, is deposited, forming structure 1400.

Figure 15:
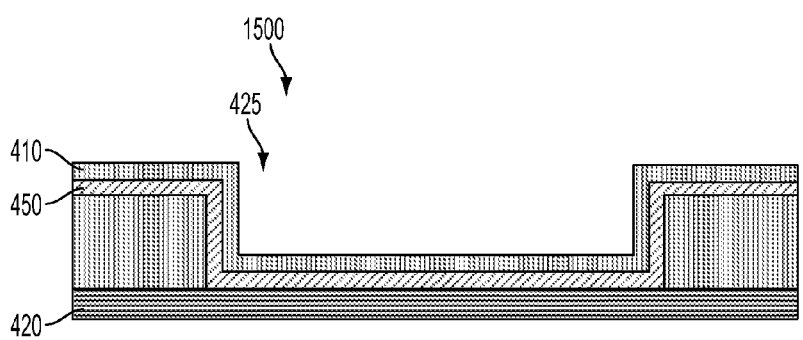
FIG. 15 is a cross-section view illustrating various aspects of a third step in an exemplary process to form a short yoke length coil in accordance with a second embodiment of the disclosure.
Figure 16:
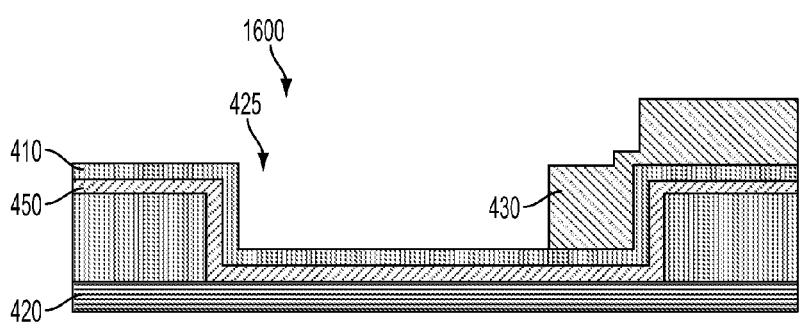
FIG. 16 is a cross-section view illustrating various aspects of a fourth step in an exemplary process to form a short yoke length coil in accordance with a second embodiment of the disclosure.
Figure 17:
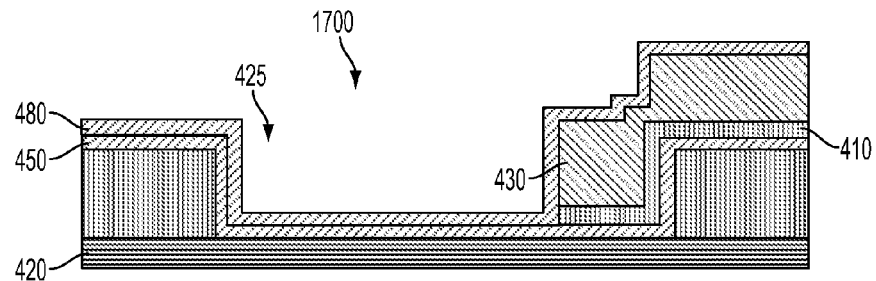
FIG. 17 is a cross-section view illustrating various aspects of a fifth step in an exemplary process to form a short yoke length coil in accordance with a second embodiment of the disclosure.

In FIG. 15 a seed layer of conductive material 410 (e.g., Cu) is deposited over the ALD layer 450, forming structure 1500. Conductive materials deposited at any stage of the process may be a metal, such as Cu, Ag, Au, a superconducting material, now known or yet to be discovered, or equivalents. The conductive materials may be deposited by any of numerous methods, including thermal evaporation, vapor deposition, plating, or equivalents. In FIG. 16 a photolithographic pattern defines an exposed region of the conductive material seed layer 410, on which conductive material 430 (e.g., Cu) may be deposited (e.g., by plating) to a specified thickness, beginning the formation of a first coil loop, forming structure 1600. In FIG. 17 the exposed conductive material seed layer 410 is milled away (using, for example, but not limited to, reactive ion milling), exposing a portion of the substrate within the cavity 425 down to the insulating ALD layer 450, forming structure 1700.

Figure 18:
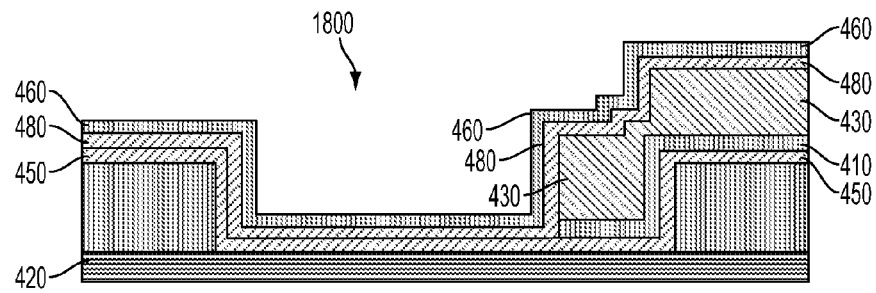
FIG. 18 is a cross-section view illustrating various aspects of a sixth step in an exemplary process to form a short yoke length coil in accordance with a second embodiment of the disclosure.
Figure 19:
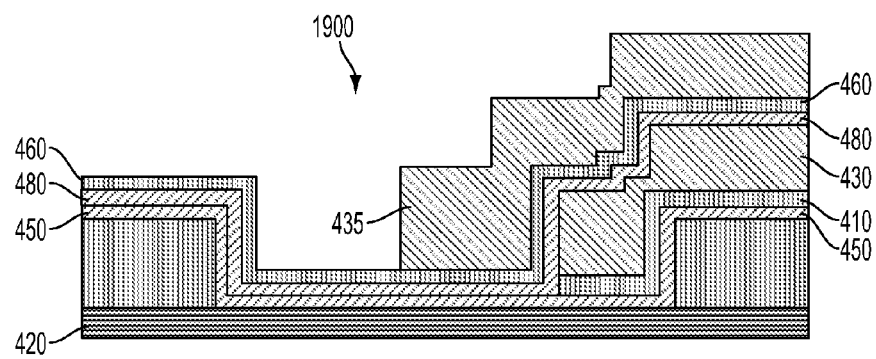
FIG. 19 is a cross-section view illustrating various aspects of a seventh step in an exemplary process to form a short yoke length coil in accordance with a second embodiment of the disclosure.
Figure 20:
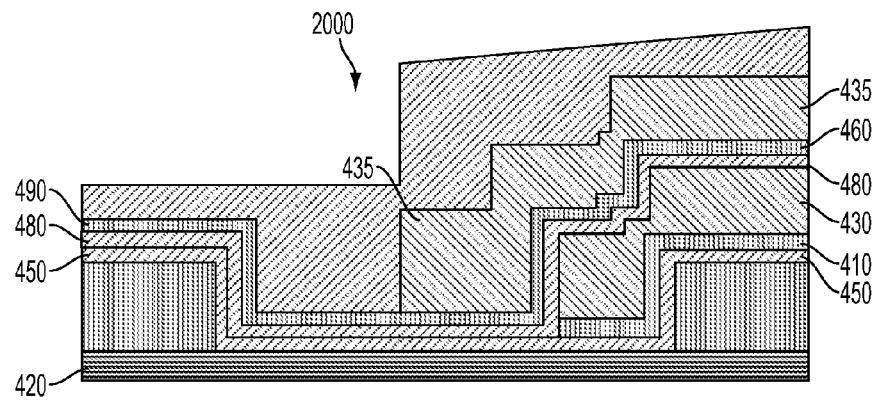
FIG. 20 is a cross-section view illustrating various aspects of an eighth step in an exemplary process to form a short yoke length coil in accordance with a second embodiment of the disclosure.

In FIG. 18 a second insulating ALD layer 480 covers the structure, followed by a conductive material seed layer 460 deposited over the ALD layer 480, forming structure 1800. In FIG. 19 a photolithographic patterning, may optionally be provided to expose a portion of the seed layer 460, followed by deposition of a conductive material 435 (e.g. Cu plating) to a specified thickness, forming structure 1900. In FIG. 20 the portion of exposed conductive seed layer 460 is milled away, and another insulator layer 490, such as alumina, may be deposited to fill any gaps that may exist, forming structure 2000.

Figure 21:
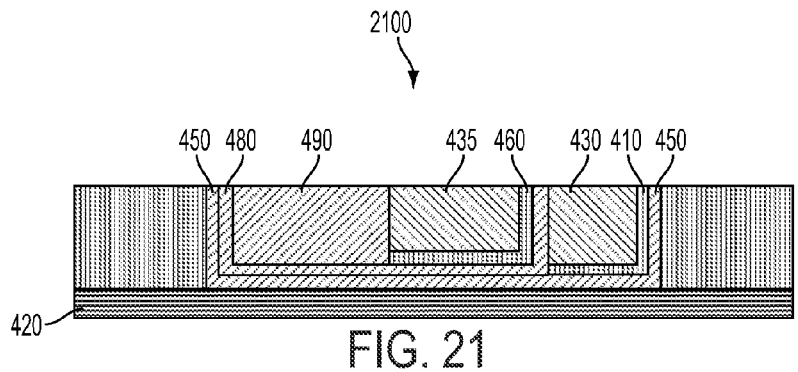
FIG. 21 is a cross-section view illustrating various aspects of a ninth step in an exemplary process to form a short yoke length coil in accordance with a second embodiment of the disclosure.
Figure 22:
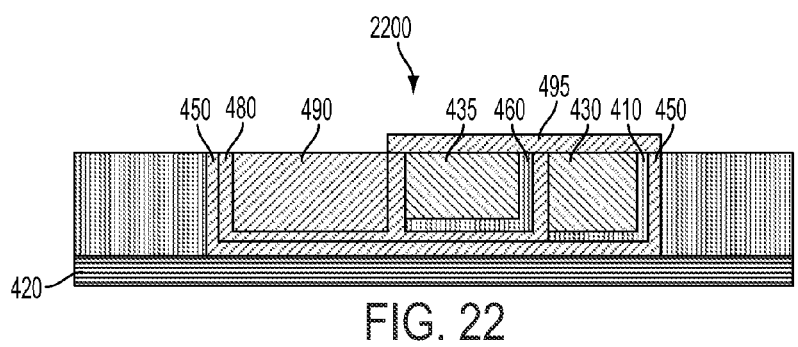
FIG. 22 is a cross-section view illustrating various aspects of a tenth step in an exemplary process to form a short yoke length coil in accordance with a second embodiment of the disclosure.

In FIG. 21 the structure is CMP polished approximately down to the height of the cavity top to planarize the entire structure, including removal of any top surface insulating ALD layer 490, 480, 450. In FIG. 22, using photolithography and an insulating cap layer 495 (e.g., alumina) is formed over the two coil loops 430, 435, shown as structure 2200.

Figure 23:
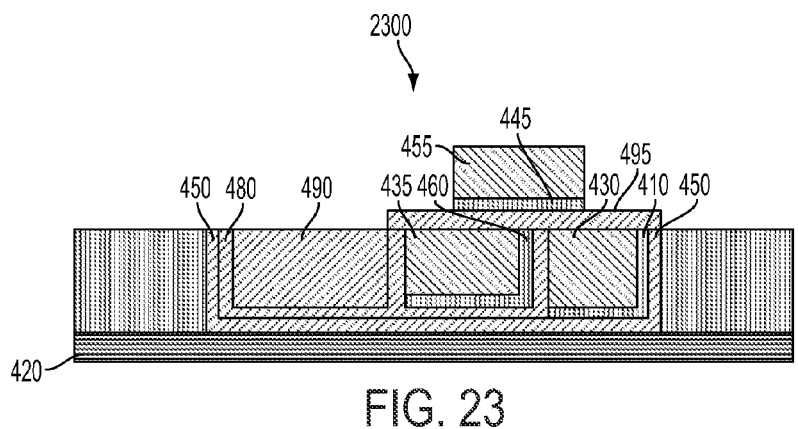
FIG. 23 is a cross-section view illustrating various aspects of an eleventh step in an exemplary process to form a short yoke length coil in accordance with a second embodiment of the disclosure.

Optionally, an additional conductive coil loop may be formed above the structure 2200 of FIG. 22 on top of the insulating ALD layer 195, forming structure 2300, as shown in FIG. 23, where steps including photolithography, seeding a conductive layer 445, plating a conductive material layer 455 and employing CMP in appropriate order, as described above.

Figure 24:
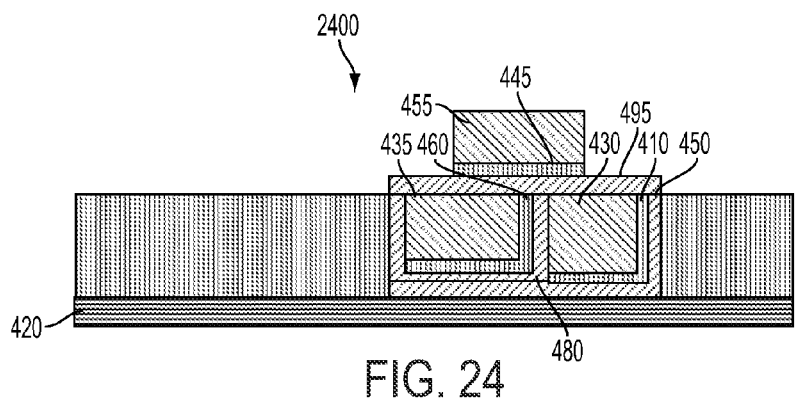
FIG. 24 is a cross-section view illustrating various aspects of an alternative to the structure shown in FIG. 21 in an exemplary process to form a short yoke length coil in accordance with a second embodiment of the disclosure.

The width of the gap filled with ALD insulator 490 may, as a matter of choice, be zero, in which case a structure 2400 has an appearance as shown in FIG. 24.

In another embodiment, a method for providing a magnetic writer is illustrated with reference to FIGS. 25-35.

Figure 25:
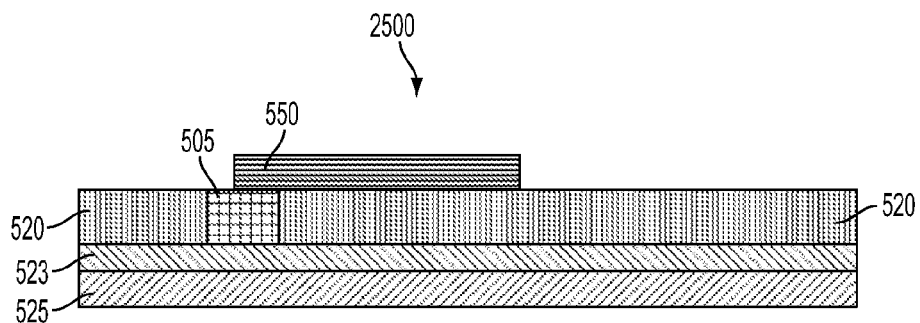
FIG. 25 is a cross-section view illustrating various aspects of a first step in an exemplary process for forming a short yoke length coil in accordance with a third embodiment of the disclosure.

In FIG. 25, an insulating layer 550 may be patterned on a magnetic alloy substrate 520, 525, which may include more than one layer of magnetic material, shown as structure 2500. Between magnetic layers 520, 525 there may be formed a non-magnetic write gap layer 523. The insulating layer 550 may be alumina, for example, or an equivalent material, and may be deposited any suitable process. A region 505 may be filled with an insulator, such as alumina, to separate the magnetic alloy of at least one layer, e.g., 520, into more than one region.

Figure 26:
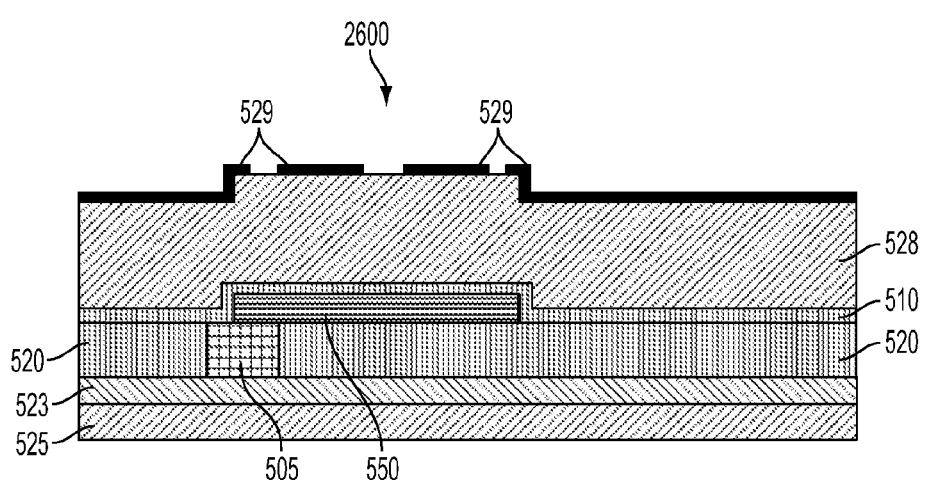
FIG. 26 is a cross-section view illustrating various aspects of a second step in an exemplary process for forming a short yoke length coil in accordance with a third embodiment of the disclosure.
Figure 27:
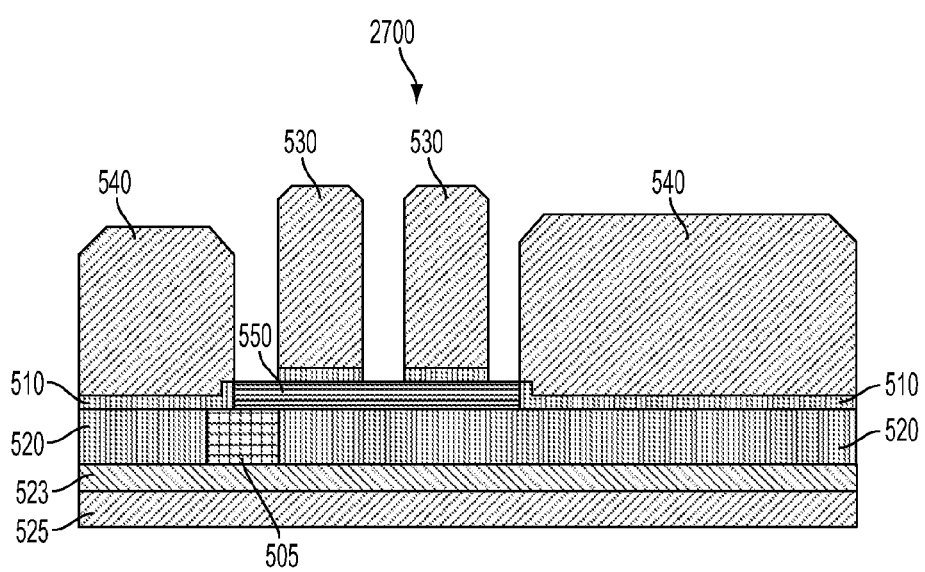
FIG. 27 is a cross-section view illustrating various aspects of a third step in an exemplary process for forming a short yoke length coil in accordance with a third embodiment of the disclosure.

Referring to FIG. 26, a seed layer 510 of conductive material (e.g., Cu) may be deposited on the substrate 520 and insulator 505. Conductive material 528 may then be plated (e.g., electroplated) on the seed layer 510. A photolithographically patterned mask 529 may be disposed over the plated conductive material 528, providing structure 2600. The conductive material 528 and seed layer 510 may be etched to form coil loops 530, and additional conductive material 540, as shown in FIG. 27. The photomask 529 may then be removed, providing structure 2700, where the additional conductive material 540 will later be sacrificed. Those skilled in the art understand that the same structure may be realized by variations in the order of steps described above.

Figure 28:
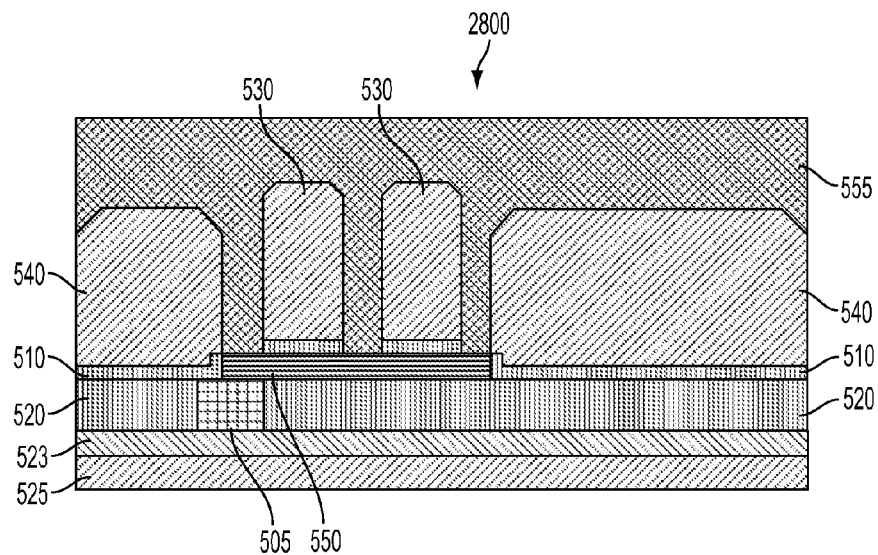
FIG. 28 is a cross-section view illustrating various aspects of a fourth step in an exemplary process for forming a short yoke length coil in accordance with a third embodiment of the disclosure.
Figure 29:
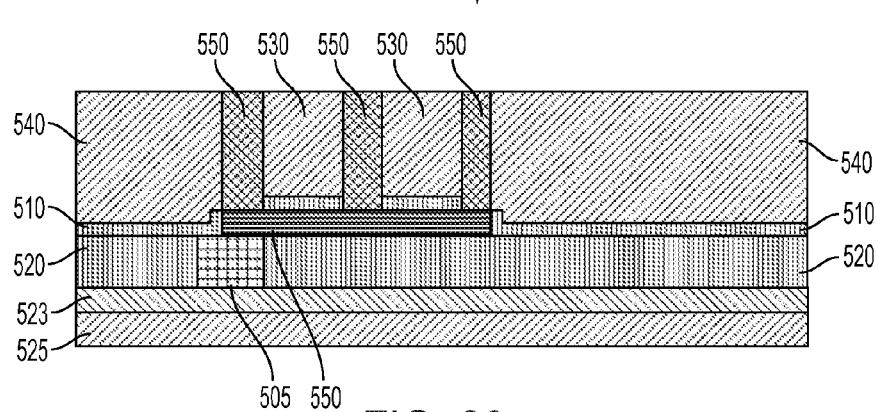
FIG. 29 is a cross-section view illustrating various aspects of a fifth step in an exemplary process for forming a short yoke length coil in accordance with a third embodiment of the disclosure.

In FIG. 28 an overcoat layer of insulator 555 (e.g., alumina) is deposited, forming structure 2800. ALD and Plasma vapor deposition are two of several possible means for depositing the insulator 555. In FIG. 29 the overcoat of insulator 555 is CMP polished to planarize and expose the conductive coil loops 530 and surrounding plated sacrificial additional conductive material 540 to provide structure 2900.

Figure 30:
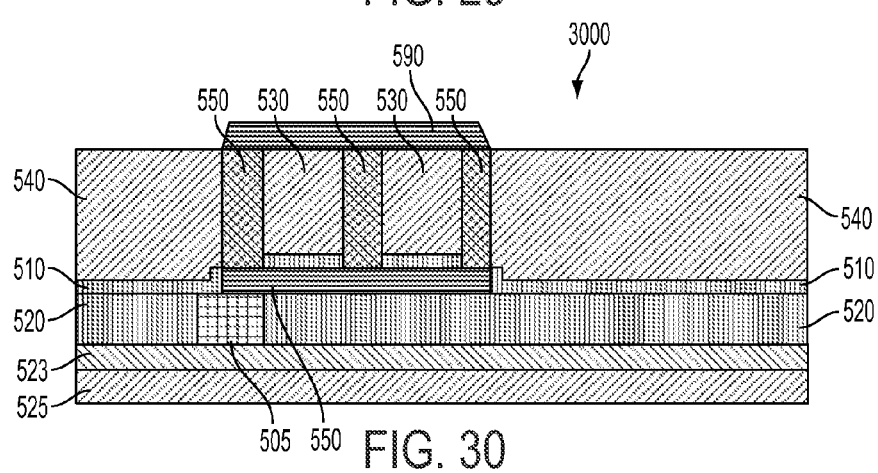
FIG. 30 is a cross-section view illustrating various aspects of a sixth step in an exemplary process for forming a short yoke length coil in accordance with a third embodiment of the disclosure.
Figure 31:
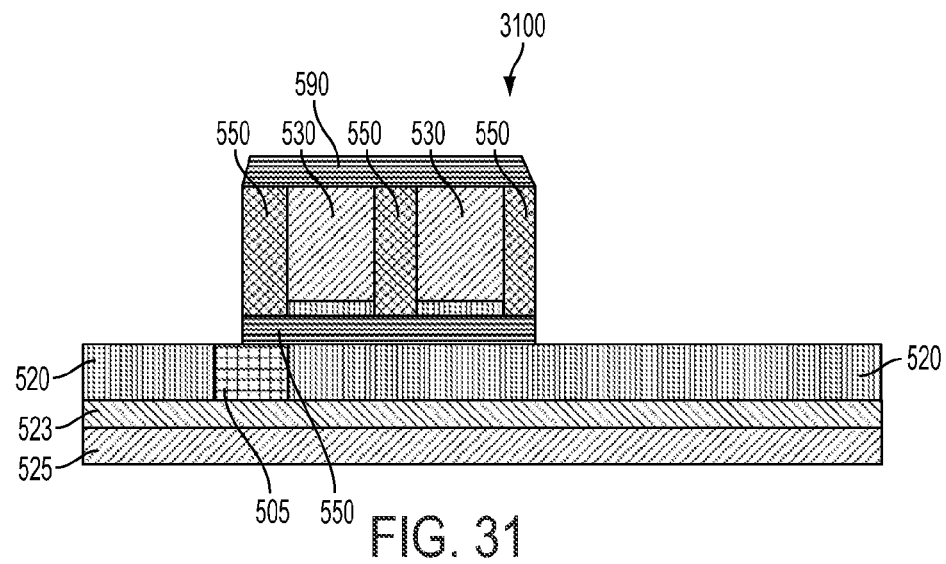
FIG. 31 is a cross-section view illustrating various aspects of a seventh step in an exemplary process for forming a short yoke length coil in accordance with a third embodiment of the disclosure.

In FIG. 30 a patterned protective insulating cap 590, such as alumina, may be deposited over the conductive material coil loops 530, as shown in structure 3000. In FIG. 31 the surrounding plated sacrificial conductive material 540 and metal seed 510 located below the sacrificial conductive material 540, are etched from the magnetic alloy substrate 520, leaving adjacent coil loops 530 structurally and electrically insulated from each other by the ALD layers 550, 555, 590 as structure 3100.

Figure 32:
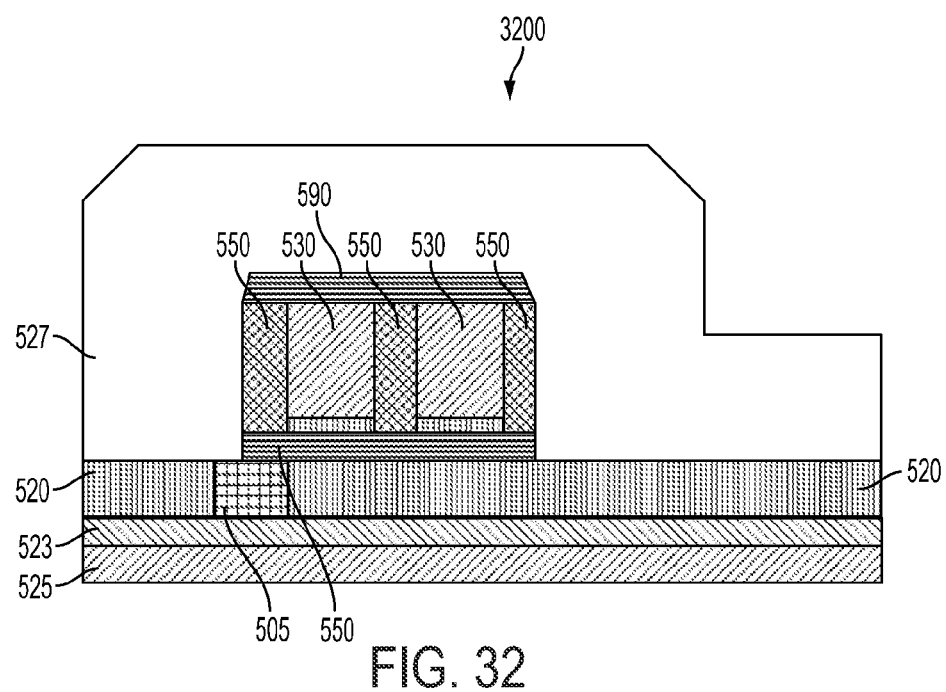
FIG. 32 is a cross-section view illustrating various aspects of an eighth step in an exemplary process for forming a short yoke length coil in accordance with a third embodiment of the disclosure.
Figure 33:
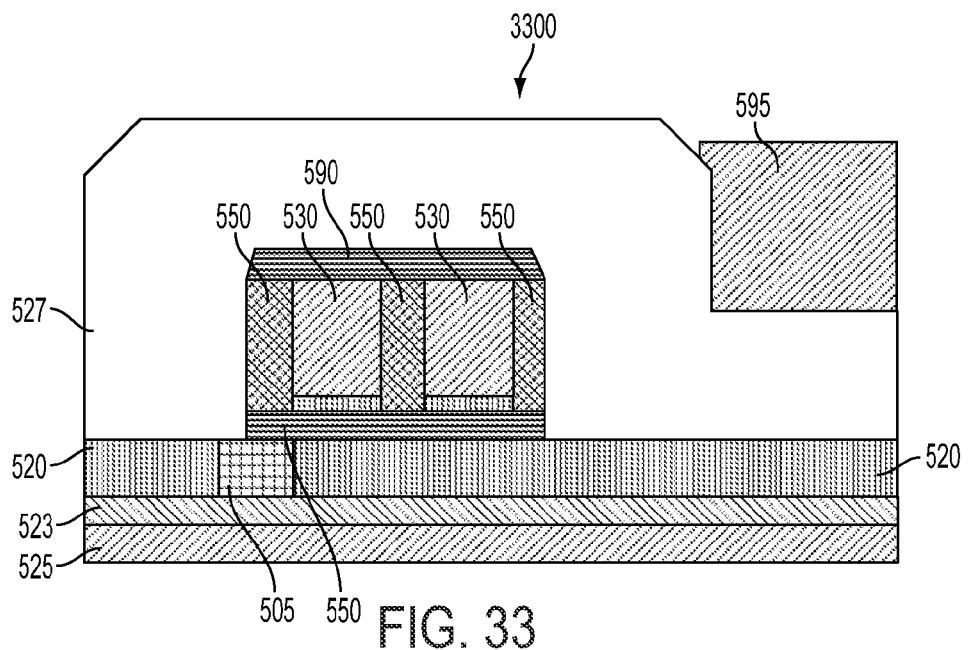
FIG. 33 is a cross-section view illustrating various aspects of a ninth step in an exemplary process for forming a short yoke length coil in accordance with a third embodiment of the disclosure.
Figure 34:
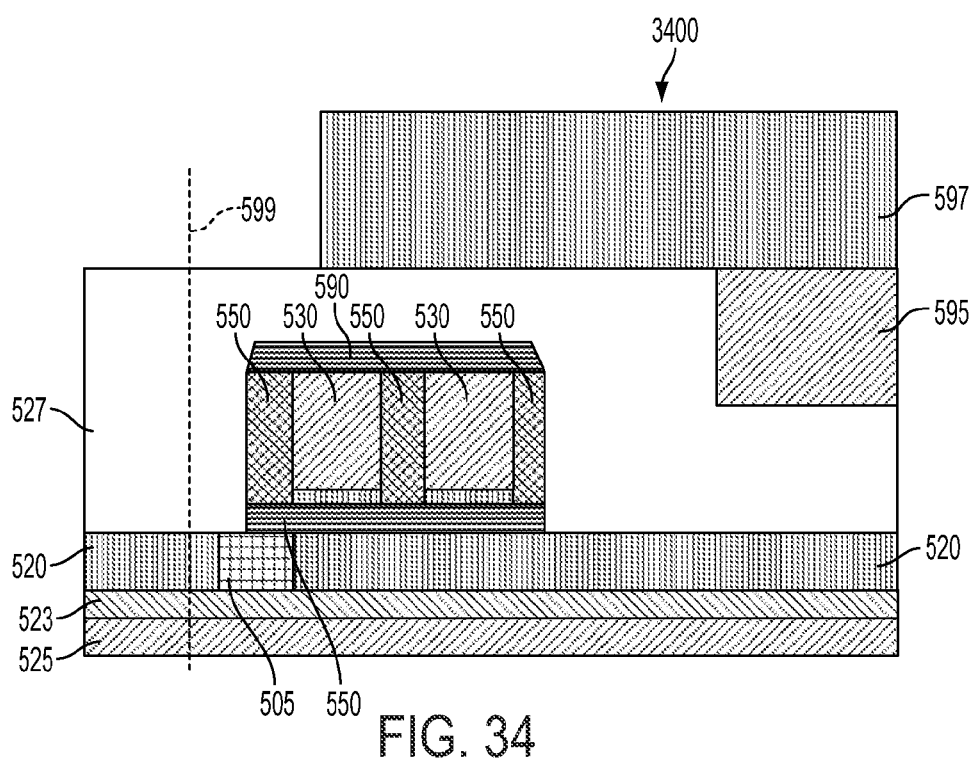
FIG. 34 is a cross-section view illustrating various aspects of a tenth step in an exemplary process for forming a short yoke length coil in accordance with a third embodiment of the disclosure.
Figure 35:
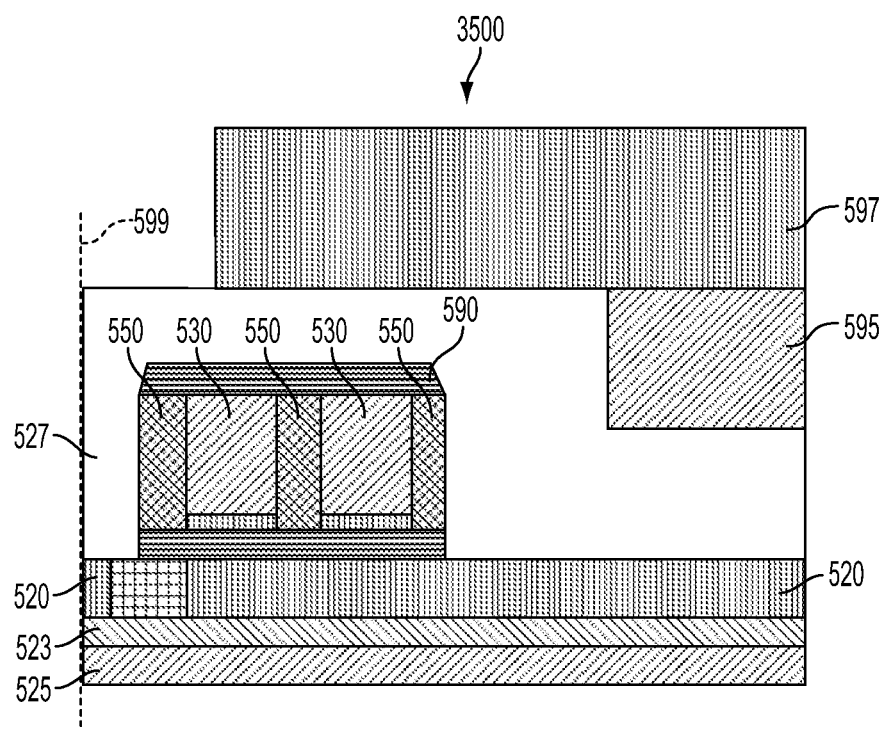
FIG. 35 is a cross-section view illustrating various aspects of an eleventh step in an exemplary process for forming a short yoke length coil in accordance with a third embodiment of the disclosure.

In FIG. 32, the entire structure 3100 may be overcoated with a layer of magnetic alloy shield material 527, forming structure 3200. In FIG. 33, an insulating filler material 595, such as, but not limited to, alumina, is deposited over at least a portion of the magnetic alloy material 527, forming structure 3300, followed by CMP planarization of the magnetic alloy 527 and filler layer 595, providing structure 3400 as shown in FIG. 34. Alternatively if the magnetic alloy shield material 527 is conformally deposited to a sufficient thickness, the filler 595 may not be used, and the process continues with FIG. 34, without filler 595. In this case, planarization may be optional, and may be skipped. In FIG. 34 a high Young's modulus protective layer 597, such as SiC, may be formed over the magnetic alloy 227, which serves to constrain the softer magnetic alloy 527 from thermal expansion that may otherwise lead to structural failure of the entire device thus formed, and for purposes of controlling write pole tip protrusion (WPTP) of the magnetic write head. The resulting structure may then be machined or polished down to the dashed line 599 shown in FIG. 34 to form an air bearing surface (ABS) 599 to reduce the distance between the coil loops 530 of the magnetic write head to the ABS, as shown in FIG. 35.

In another embodiment, for providing a magnetic write head having a single layer multi-loop coil is illustrated with reference to FIGS. 36-43.

Figure 36:
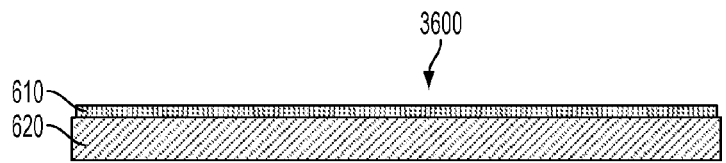
FIG. 36 is a cross-section view illustrating various aspects of a first step in an exemplary process for forming a short yoke length coil in accordance with a fourth embodiment of the disclosure.

In FIG. 36, structure 3600 is formed when a seed layer 610 of conductive material is deposited on a substrate 620, which may be an insulator. The conductive material may be Cu, which is commonly used in the formation of inductive coils, but other materials, such as silver, gold, superconducting or other conducting material not yet discovered or developed, may be used to equivalent purpose.

Figure 37:
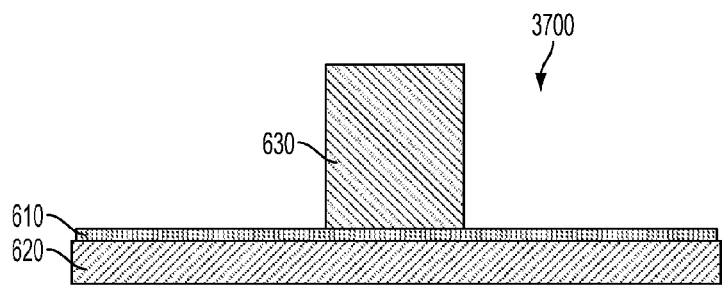
FIG. 37 is a cross-section view illustrating various aspects of a second step in an exemplary process for forming a short yoke length coil in accordance with a fourth embodiment of the disclosure.
Figure 38:
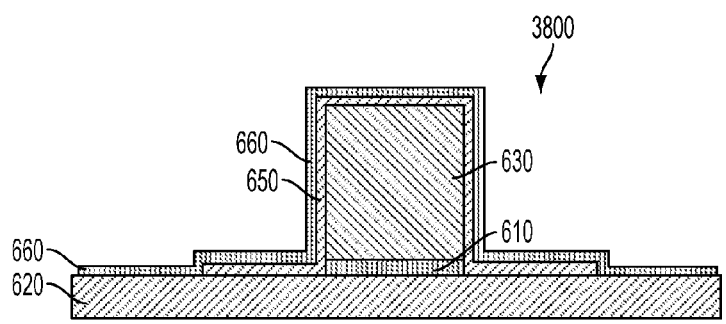
FIG. 38 is a cross-section view illustrating various aspects of a third step in an exemplary process for forming a short yoke length coil in accordance with a fourth embodiment of the disclosure.

In FIG. 37 conductive material 630 may be selectively deposited, such as by plating on the seed layer 610 where a photolithographic mask or equivalent exposes a selected portion of the seed layer 610, to form a first coil loop 630, shown as structure 3700. In FIG. 38 a first insulating layer 650, may be formed over the first conductive loop 630 and at least a portion of the substrate 620 for forming additional conductive loops in subsequent steps. The method of insulator deposition may be atomic layer deposition (ALD), but is not limited to any single method, and any equivalent process may be used, where the benefit of forming thin insulating layers, on the order of less than 1 micron, is available. The material may be alumina, but is not so limited, and may be one of any equivalent insulating materials that may include silicon oxide, aluminum oxide, silicon nitride, aluminum nitride, and the like.

Still referring to FIG. 38, a second seed layer 660 of conductive material may be deposited on the substrate 620, including on the first insulating layer 650 and the first coil loop 630, providing the structure 3800.

Figure 39:
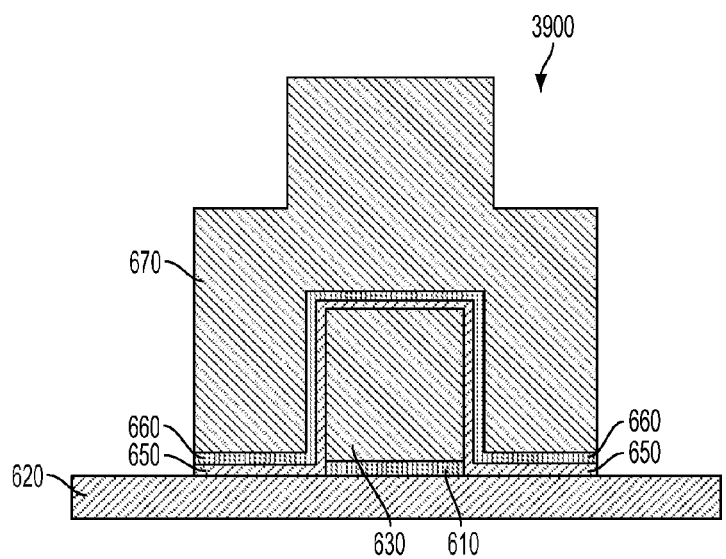
FIG. 39 is a cross-section view illustrating various aspects of a fourth step in an exemplary process for forming a short yoke length coil in accordance with a fourth embodiment of the disclosure.

In FIG. 39 a photolithographic mask may be used to expose the seed layer 660 above the first coil loop 630 and portions of the substrate 620 adjacent to each side of the first coil loop 630 on which two additional coil loops may later be formed. Conductive material 670 may be plated on the exposed seed layer, as shown in FIG. 39, providing the structure 3900.

Figure 40:
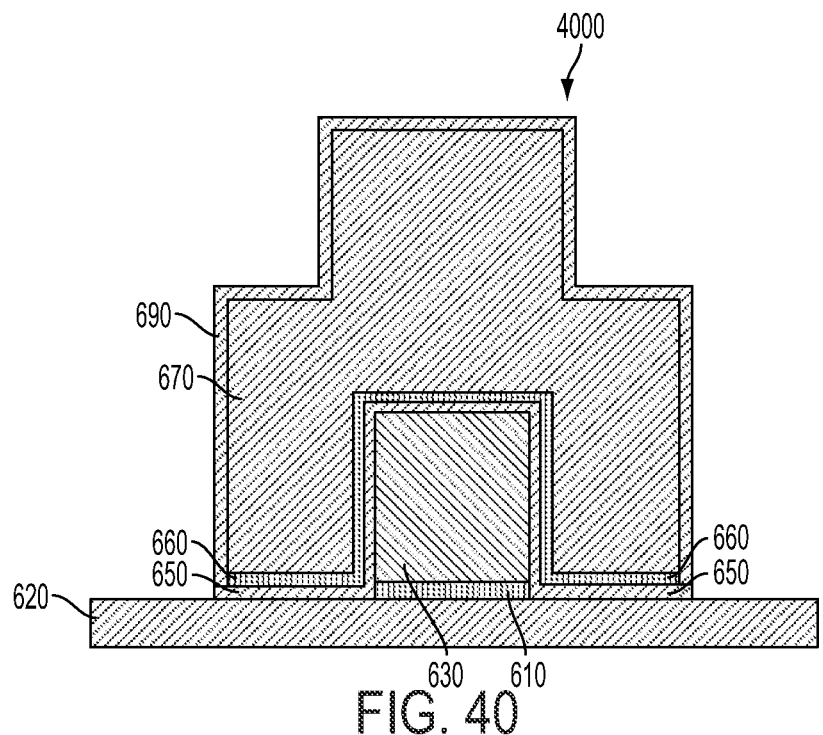
FIG. 40 is a cross-section view illustrating various aspects of a fifth step in an exemplary process for forming a short yoke length coil in accordance with a fourth embodiment of the disclosure.

In FIG. 40 an insulating layer 690, such as alumina or the equivalent, formed by ALD or an equivalent process, is deposited at least over the first coil loop 630 and portions where the two additional coil loops will later be formed. Photolithographic masking may be used to mask areas to be protected from seed layer and ALD deposition. The photolithographic mask may be removed, which lifts and removes undesired seed layer and insulating material, as shown in FIG. 40 as structure 4000. Additionally, an overcoat of another material (not shown) may be deposited over the entirety of structure 4000 to facilitate CMP (described below with respect to FIG. 41), and which may then later be removed.

Figure 41:
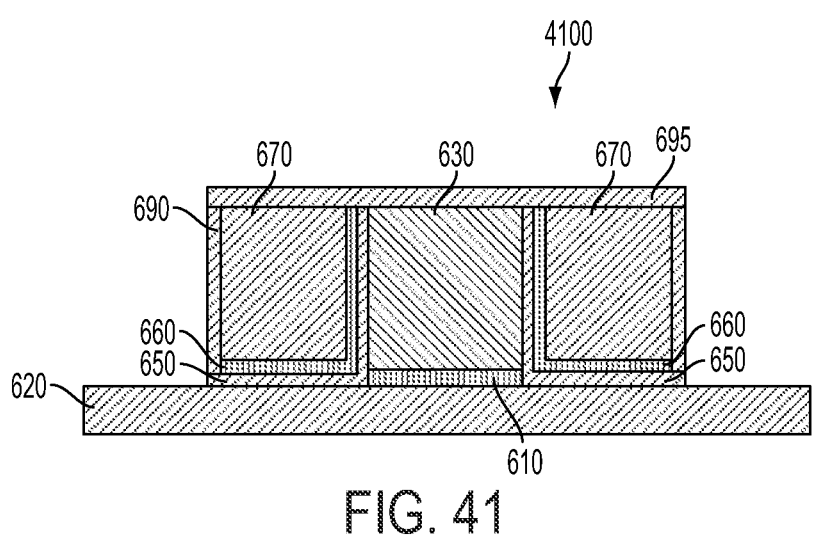
FIG. 41 is a cross-section view illustrating various aspects of a sixth step in an exemplary process for forming a short yoke length coil in accordance with a fourth embodiment of the disclosure.

The structure 4000 may then planarized using, for example, chemical mechanical polishing (CMP) to remove material to the extent that the first coil loop 630 is exposed, i.e., a top layer of ALD insulator 660 is removed from the first coil loop 630. Two adjacent coil loops 670 are thus formed, where each coil loop is insulated on both sides from any adjacent coil loop, and any future material to be deposited thereon. In FIG. 41 a cap layer of insulating material 695 may be deposited on the top surface of the first and additional coil loops 630, 670, providing the structure 4100. The method of deposition may be ALD or an equivalent process.

Figure 42:
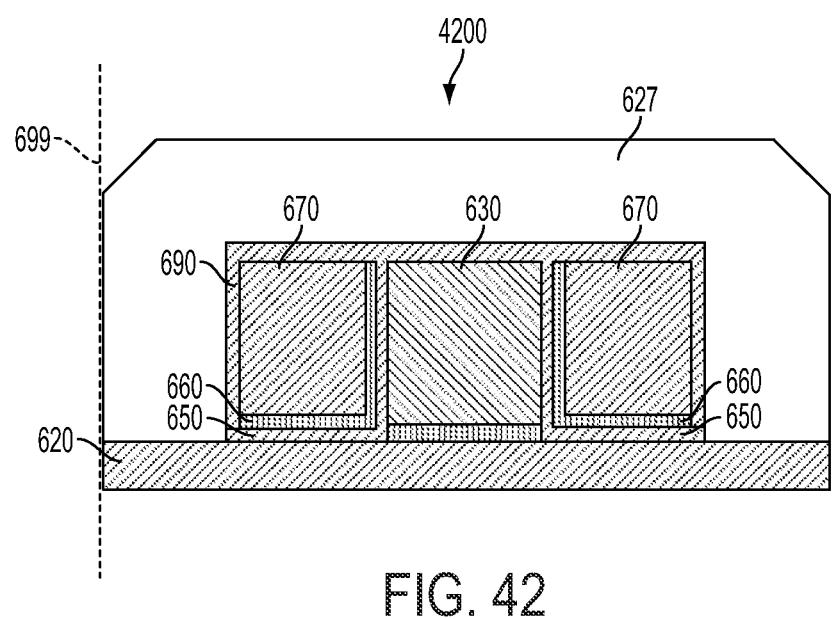
FIG. 42 is a cross-section view illustrating various aspects of a seventh step in an exemplary process for forming a short yoke length coil in accordance with a fourth embodiment of the disclosure.

In FIG. 42 a layer of magnetic material 627 may be deposited to encapsulate the multi-loop coil formed in the above steps, providing structure 4200. The magnetic material 627 may form at least a portion of the shield. An air bearing surface (ABS) 699 indicates the surface that approaches the magnetic read/write disk.

It may be appreciated that the use of ALD and sacrificial materials in the embodiments disclosed have the benefit of providing a more compact coil structure, thus concentrating the magnetic field that may be provided by inductive coil loops closer to the ABS 699, enabling a denser track spacing and increasing the storage capacity of disks.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for.

What is claimed is:

1. A method of forming a multi-turn coil comprising:
   forming a first conductive coil on a substrate arranged with an electrical interconnect pattern;
   forming an insulating atomic layer deposition (ALD) layer on the first coil;
   after forming the ALD layer, forming one or more additional conductive coils on each of adjacent sides of the first coil insulated from the first coil and the substrate by the insulating layer;
   planarizing the ALD to expose the first and the one or more additional conductive coils;
   forming an insulating cap on the exposed first and the one or more additional conductive coils; and
   forming a layer of magnetic material over the ALD coated and capped first and the one or more additional conductive coils.

2. The method of claim 1, wherein the forming the first conductive coil further comprises:
   forming a seed layer of a conductive material on the substrate;
   forming a photolithographic mask to expose portions of the seed layer; and
   plating a conductive material on the exposed seed layer to form a precursor coil and additional sacrificial conductive material.

3. The method of claim 2, wherein the forming of the insulating atomic layer deposition (ALD) layer on the first coil comprises depositing an atomic layer deposition (ALD) insulating material to encapsulate and insulate the precursor coil and additional sacrificial conductive material from each other.

4. The method of claim 3, wherein the insulating material is at least one of alumina, silicon oxide, silicon nitride and aluminum nitride.

5. The method of claim 3, wherein the planarizing of the ALD comprises removing by chemical mechanical polishing (CMP) an amount of the atomic layer deposition (ALD) insulating material to expose the additional sacrificial conductive material.

6. The method of claim 5, wherein forming the insulating cap comprises forming an insulating material cap layer by ALD to mask the first and the one or more additional conductive coils and the deposited ALD layer, thereby insulating the first and the one or more additional conductive coils and additional sacrificial conductive material.

7. The method of claim 6, further comprising removing the additional sacrificial conductive material.

8. The method of claim 7, further comprising depositing magnetic material to encapsulate the first and the one or more additional conductive coils.

9. The method of claim 8, further comprising:
   depositing an insulating filler material over at least a portion of the encapsulating magnetic material; and
   planarizing the encapsulated magnetic material and filler material.

10. The method of claim 9, further comprising depositing a stiffening material over at least a portion of the planarized encapsulated magnetic material and filler material, wherein the stiffening material has a Young's modulus greater than the encapsulated magnetic material and filler material.

11. The method of claim 10, further comprising removing a portion of encapsulated magnetic material and substrate to form an air bearing surface.

* * * * *